US010341436B2

(12) United States Patent
Tan et al.

(10) Patent No.: US 10,341,436 B2
(45) Date of Patent: Jul. 2, 2019

(54) USING CLOUD STORAGE AS TEMPORARY CACHE FOR BACKUP

(71) Applicant: Dell Products L.P., Round Rock, TX (US)

(72) Inventors: Danilo O. Tan, Austin, TX (US); Abu Shaher Sanaullah, Austin, TX (US); Fernando L. Guerrero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 15/265,734

(22) Filed: Sep. 14, 2016

(65) Prior Publication Data
US 2018/0077219 A1    Mar. 15, 2018

(51) Int. Cl.
| | |
|---|---|
| G06F 15/16 | (2006.01) |
| H04L 29/08 | (2006.01) |
| H04N 5/765 | (2006.01) |
| H04N 9/804 | (2006.01) |
| H04N 21/218 | (2011.01) |
| H04N 21/231 | (2011.01) |
| H04N 21/2743 | (2011.01) |
| H04N 21/6587 | (2011.01) |
| H04N 21/845 | (2011.01) |

(52) U.S. Cl.
CPC ...... *H04L 67/1097* (2013.01); *H04L 67/2842* (2013.01); *H04N 5/765* (2013.01); *H04N 9/8042* (2013.01); *H04N 21/2181* (2013.01); *H04N 21/21815* (2013.01); *H04N 21/231* (2013.01); *H04N 21/23106* (2013.01); *H04N 21/23116* (2013.01); *H04N 21/2743* (2013.01); *H04N 21/6587* (2013.01); *H04N 21/845* (2013.01)

(58) Field of Classification Search
CPC ... H04L 67/025; H04L 67/06; H04L 67/1097; H04L 67/16; H04N 5/44; H04N 5/76
USPC ................................................. 709/203, 248
See application file for complete search history.

(56) References Cited

U.S. PATENT DOCUMENTS

| | | | |
|---|---|---|---|
| 9,325,791 B1 * | 4/2016 | Blahaerath | .......... H04L 67/1097 |
| 9,680,809 B2 * | 6/2017 | Seul | .................... G06F 21/6218 |
| 9,747,057 B1 * | 8/2017 | Ramani | ................. G06F 3/0652 |
| 2002/0186402 A1 * | 12/2002 | Jackson | ............. H04N 1/00132 |
| | | | 358/1.15 |

(Continued)

*Primary Examiner* — Moustafa M Meky
*Assistant Examiner* — Thorne E Waugh
(74) *Attorney, Agent, or Firm* — Campbell Stephenson LLP; Shiv. S. Naimpally

(57) ABSTRACT

Systems and methods are described to transfer content from a first computing device to a second computing that is not directly accessible from the first computing device. The transfer may be carried out using an application operating on the first computing device that uploads the content to the cloud storage service. The second computing device may operate an application that monitors the cloud storage service for recently uploaded content. When the second computing device detects that content has been uploaded to the cloud storage service, the second computing device may download the content. The second computing device may update a manifest file located on the cloud storage service to indicate that the content was downloaded. Subsequently, the first computing device may access the manifest file and determine that content was downloaded.

20 Claims, 11 Drawing Sheets

(56) References Cited

U.S. PATENT DOCUMENTS

| | | | |
|---|---|---|---|
| 2006/0129627 A1* | 6/2006 | Phillips | H04L 63/10 709/200 |
| 2012/0030237 A1* | 2/2012 | Tanaka | G06F 17/3028 707/770 |
| 2012/0136936 A1* | 5/2012 | Quintuna | G06F 21/604 709/204 |
| 2013/0132477 A1* | 5/2013 | Bosworth | G06Q 50/01 709/204 |
| 2014/0258405 A1* | 9/2014 | Perkin | H04W 4/021 709/204 |
| 2015/0113172 A1* | 4/2015 | Johnson | H04L 67/34 709/245 |
| 2015/0350371 A1* | 12/2015 | Woods | H04L 67/2852 707/620 |
| 2016/0275303 A1* | 9/2016 | Narayanaswamy | G06F 21/6218 |
| 2016/0323262 A1* | 11/2016 | Tan | G06F 21/10 |
| 2017/0005999 A1* | 1/2017 | Choyi | H04L 63/0435 |
| 2017/0006314 A1* | 1/2017 | Danovitz | H04L 67/1097 |
| 2017/0055136 A1* | 2/2017 | Lee | H04W 4/21 |
| 2017/0206218 A1* | 7/2017 | Jai | G06F 17/30156 |
| 2017/0359353 A1* | 12/2017 | Tan | G06F 3/0605 |

* cited by examiner

800 ⟶

```
<?xml version="1.0" encoding="UTF-8"?>
   . . .
<manifest>
       <file name="image1.jpg" size="239K" hashcode="1329FA23">                                    802
           <download time="2016-02-03 22:12:12 GMT">
               <successful="Y" />
           </download>
           <backup time="2016-02-03 22:13:15 GMT">
               <successful="Y" />
           </backup>
           <delete time="2016-02-03 22:15:15 GMT" />
       </file>
       . . .
       <file name="video1.mpg" size="250K" portion="1" hashcode="1DA23934" />                      804
       <file name="video1.mpg" size="250K" portion="2" hashcode="2939DA9d" />

<file name="image2.jpg" size="59K" hashcode="7869B393">                                     806
           <download time="2016-01-05 10:12:12 GMT">
               <successful="Y" />
           </download>
           <backup time="2016-01-05 22:10:15 GMT">
               <successful="N" msg="could not complete backup; potential malware detected" />
           </backup>
       </file>
   . . .
</manifest>
```

```
┌─────────────────────────────────────────────────────────────┐
│ DETERMINE A CLOUD STORAGE SERVICE TO USE AS TEMPORARY CACHE │
│                    FOR ONGOING BACKUP                       │
│                           902                               │
└─────────────────────────────────────────────────────────────┘
                              │
                              ▼
┌─────────────────────────────────────────────────────────────┐
│          DETERMINE CONTENT TYPES FOR ONGOING BACKUP         │
│                           904                               │
└─────────────────────────────────────────────────────────────┘
                              │
                              ▼
┌─────────────────────────────────────────────────────────────┐
│           DETERMINE CONDITIONS FOR ONGOING BACKUP           │
│                           906                               │
└─────────────────────────────────────────────────────────────┘
                              │
                              ▼
┌─────────────────────────────────────────────────────────────┐
│               MONITOR DEVICE FOR STORED CONTENT             │
│                           908                               │
└─────────────────────────────────────────────────────────────┘
                              │
                              ▼
┌─────────────────────────────────────────────────────────────┐
│    DETECT CONTENT STORED ON DEVICE WITH TYPE FOR ONGOING    │
│                          BACKUP                             │
│                           910                               │
└─────────────────────────────────────────────────────────────┘
                              │
                              ▼
┌─────────────────────────────────────────────────────────────┐
│   DETERMINE CURRENT CONDITIONS SATISFY CONDITIONS FOR       │
│                    ONGOING BACKUP                           │
│                           912                               │
└─────────────────────────────────────────────────────────────┘
                              │
                              ▼
┌─────────────────────────────────────────────────────────────┐
│              SEND CONTENT TO CLOUD STORAGE SERVICE          │
│                           914                               │
└─────────────────────────────────────────────────────────────┘
```

ONGOING BACKUP CONFIGURATION　　　　　　　　　　　　　　　　　　　　[ SAVE ]

CONTENT TYPES 1002

| NAME: | OLD EMAIL ATTACHMENTS |
|---|---|
| APP / FOLDER: | EMAIL APP |
| FILE TYPE(S): | IMAGES; VIDEOS; PRESENTATIONS |
| OLDER THAN: | 1 MONTH |

[ ADD > ]

```
VOICEMAILS
WORK DOCUMENTS
MY PHOTOGRAPHS
```

CLOUD STORAGE SERVICES 1004

| NAME: | CLOUD STORAGE 1 |
|---|---|
| TYPE: | CLOUD STORAGE CLIENT 2.0 |
| LOGIN: | BSMITH@SMITH.NET / ******** |
| MAX STORAGE: | 500 MB |
| PRIORITY LEVEL: | 2 |

[ ADD > ]

[ MORE SETTINGS ]

```
CLOUD STORAGE 2 (1)
CLOUD 3 PERSONAL ACCOUNT (2)
CLOUD 3 WORK ACCOUNT (2)
MY PUBLIC FTP (2)
```

CONDITIONS 1006

CONDITION TYPE:
[ DEVICE POWER ]

COMPARATOR: VALUE: CONNECTOR:
[ >= ]　[ 10% ]　[ AND ]

[ ADD > ]

```
TIME IS BETWEEN 1 AM AND 5 AM AND
NOT LOCATION IS HOME AND
AVAIL DEVICE STORAGE < 50%
```

FIG. 10

USING CLOUD STORAGE AS TEMPORARY CACHE FOR BACKUP

BACKGROUND

Computing devices are capable of generating large volumes of digital content. For example, a user may use his smartphone to capture photographs or download voicemails or multimedia. As another example, a home security camera is capable of generating a constant stream of video content. A user may wish to move such content from one computing device to another. However, movement of large amounts of content may be difficult because the two computing devices may not be directly accessible to each other. For example, when the user is traveling on a vacation, his smartphone may not have direct access to a backup system located at the user's home network. Thus, vacation photographs stored on the smartphone cannot be backed up until the user returns from vacation. As another example, a security camera operating in the user's home network may not have direct access to the user's work computer. Thus, the user cannot monitor the video content generated by the security camera when he is at work. The user may find it time consuming and tedious to manually set up data transfer processes between his various computing devices.

SUMMARY

This Summary provides a simplified form of concepts that are further described below in the Detailed Description. This Summary is not intended to identify key or essential features and should therefore not be used for determining or limiting the scope of the claimed subject matter.

Systems and methods are described to transfer content from a first computing device to a second computing device that is not directly accessible from the first computing device. The transfer may be carried out using an uploader application operating on the first computing device. The uploader application may determine that the first computing device has current access to a cloud storage service. The upload application may upload the content to the cloud storage service. The second computing device may operate a downloader service that monitors the cloud storage service for recently uploaded content. When the second computing device detects that content has been uploaded to the cloud storage service, the second computing device may download the content. The second computing device may update a manifest file located on the cloud storage service to indicate that the content was downloaded. Subsequently, the first computing device may access the manifest file and determine that content was downloaded. Once the content is downloaded to the second computing device, the content may be deleted from the cloud storage service and/or the first computing device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 8 illustrates a manifest file used for the transfer of content to be backed up, according to some examples.

FIG. 9 is a flowchart of a process that includes determining content types and conditions for an ongoing backup process and monitoring of content by the ongoing backup process, according to some examples.

FIG. 10 illustrates a user interface for viewing and configuring an ongoing backup of content.

DETAILED DESCRIPTION

Figure 1:
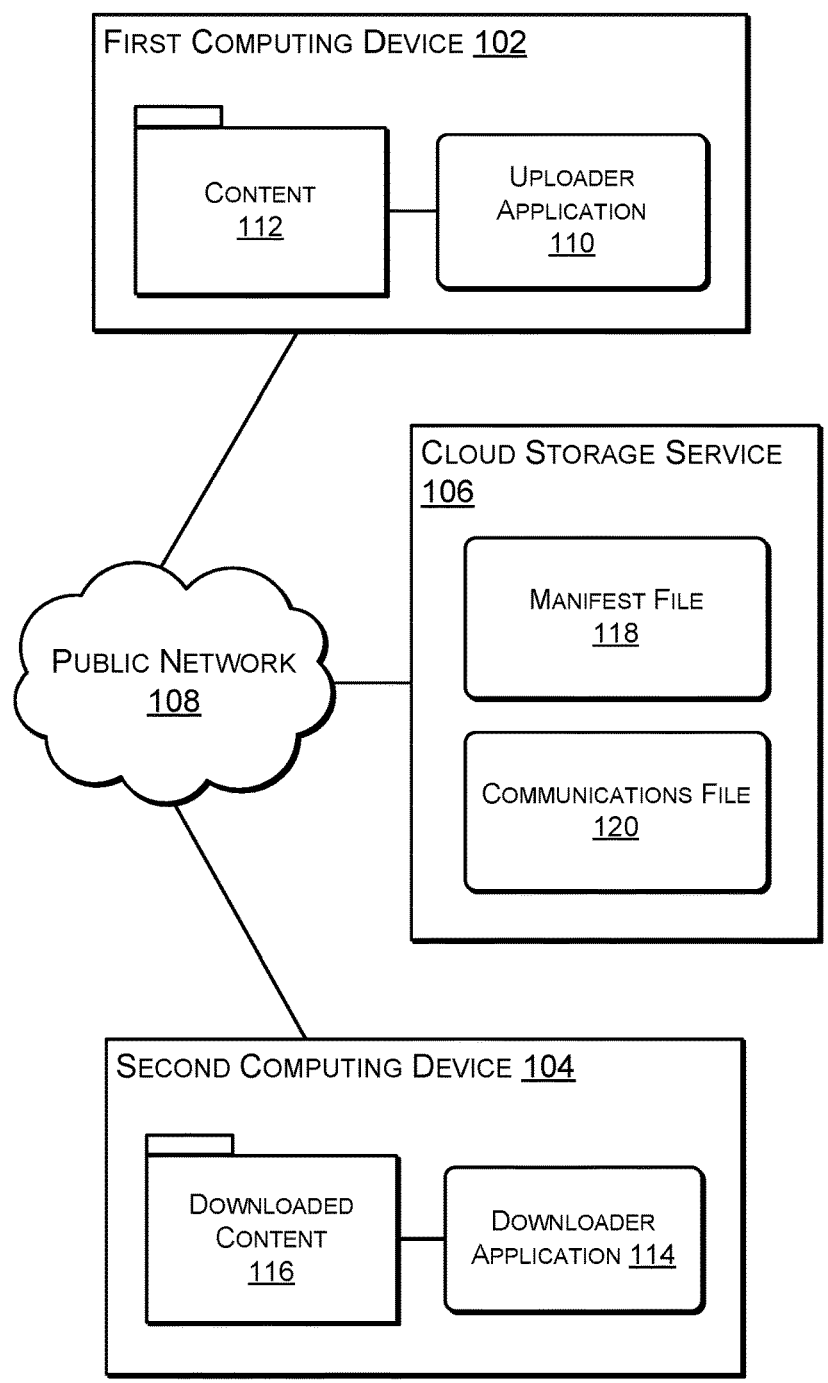
FIG. 1 is a block diagram illustrating a computing system that includes an uploader computing device, a downloader computing device, and the cloud storage service, according to some examples.

Systems and methods are described herein to transfer content stored on a first computing device to a second computing device that is not directly accessible from the first computing device. In an embodiment, the first computing device may be a mobile device such as a wireless phone. The mobile device may be capable of capturing content, such as a photograph, that is subsequently stored on the mobile device. The first computing device may be executing an uploader application to send content to a cloud storage service. The second computing device may be executing a downloader application to obtain content from a cloud storage service.

In some embodiments, the second computing device may include a backup system located in a private network associated with the user, such as the user's home network. The services and equipment in the user's home network may not be generally accessible to the public. For example, the home network may be protected by a network security system, such as a firewall, which monitors and rejects general incoming network traffic. In some cases, the backup system may backup content obtained from the cloud storage service.

In an illustrative embodiment, the mobile device may execute the uploader application to transfer content to the backup system. The uploader application accomplishes this by using a cloud storage service, such as DROPBOX™, ONEDRIVE™, or GOOGLE DRIVE™, as temporary storage. Some cloud storage service providers may provide a limited amount of storage free of charge.

In particular embodiments, the uploader application may upload content to be backed up to the cloud storage service. Cloud storage services are generally accessible from the mobile device without the mobile device having direct access to the backup system in the private network. For example, the user may have previously registered with a cloud storage service, allowing the user to access the cloud storage service from any device based on a set of credentials. Thus, the cloud storage service represents a channel through which content can be transferred from the mobile device to the backup system without requiring direct communication between the mobile device and the backup system. Further, because the uploader application communicates with the cloud storage service without communicating with the backup system, the uploader application does not need to maintain any knowledge about the identity of the computing device executing a downloader application.

In some cases, the downloader application may periodically check the cloud storage service to determine if any new content has been uploaded to the cloud storage service. If new content is detected, the downloader application may download the new content to be backed up to the backup system. If the downloader service determines that the content is successfully downloaded and backed up, it may update a manifest file on the cloud storage service, which may be used to indicate to the mobile device that it is safe to delete the copy of the content on the mobile device. The downloader service may also send a request to the cloud storage service to delete the copy of the content stored there. Thus, space on the cloud storage service is freed up, so that the cloud storage service can be used for other purposes.

As explained in further detail, this process may be configured as an ongoing process running on the mobile device to periodically back up particular types of content under user-specified conditions. The transfer techniques discussed herein may be used for any type of computers or applications. Use of these techniques are not limited to backing up content from a mobile device.

FIG. 1 is a block diagram illustrating a computing system 100 that includes a first computing device 102, a second computing device 104, and a cloud storage service 106. The first computing device 102, the second computing device 104, and the cloud storage service 106 may include network interfaces to communicate over a public network 108. Public network 108 may include a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like.

The first computing device 102 and the second computing device 104 may be any one of different types of devices. For example, the first computing device 102 and the second computing device 104 may be mobile devices (e.g., a smartphone, tablet, laptop, smart glasses, or vehicle-based computer system), a personal computer (e.g., a desktop or server), or any other suitable device and may vary in size, shape, performance, functionality, and price. The first computing device 102 and the second computing device 104 may include memory, such as random access memory (RAM), read-only memory (ROM), and/or other types of non-transitory storage media or memory devices. The first computing device 102 and the second computing device 104 may include one or more processors such as a central processing unit (CPU) and/or hardware or software control logic. Additional components of the first computing device 102 and the second computing device 104 may include one or more storage devices, one or more network interfaces for communicating with external networks as well as various input and output (I/O) devices.

The first computing device 102 may include an uploader application 110 that may be used to upload content 112 to a cloud storage service 106. The cloud storage service 106 may be provided by a cloud storage service provider such as DROPBOX™, ONEDRIVE™, or GOOGLE DRIVE™. The cloud storage service 106 comprises one or more servers that may be accessible from the public network 108. The servers may be used to store user data in the cloud computing architecture. The uploader application 110 may use a protocol or application programming interface (API) provided by the cloud storage service provider, or a client or library software provided by the cloud storage service provider. The cloud storage service 108 may impose limits on the amount of free storage space that a user can use, or charge a fee for the use of the storage. The uploader application 110 may maintain a folder for content 112 that is to be uploaded to the cloud storage service 108.

The second computing device 106 may execute a downloader application 114 that may be used to download content from the cloud storage service 108. The downloader application 114 may use a protocol or API exposed by the cloud storage service 106, or a client or library software provided by the cloud storage service provider. The downloader application 114 may be executed as a background process or a scheduled task, to periodically check for new content uploaded to the cloud storage service 106. The downloader application 114 may use the creation and/or modification timestamps of files stored by the cloud storage service 106 to determine whether particular files have been added or changed since the last time the downloader application 114 checked the cloud storage service 106. If new content is detected, the downloader application 114 may download the content and store the content in a folder as downloaded content 116. In this manner, the folder for downloaded content 116 on the second computing device 104 may be kept synchronized with the folder for content 112 on the first computing device 102.

During the data transfer from the first computing device 102 to the second computing device 104, the uploader application 110 and the downloader application 114 may not directly communicate with each other. Instead, the uploader application 114 and downloader application 118 may each communicate separately with the cloud storage service 106. In one embodiment, the cloud storage service 106 may store a manifest file 118 that is accessible by both the uploader application 110 and downloader application 114. The manifest file 118 may include a listing of the files that have been uploaded to the cloud storage service 106 by the uploader application 110. The manifest file 118 may also include information regarding the actions that are performed with respect to certain files. For example, the manifest file 118 may indicate that a particular file was successfully downloaded by the downloader application 114 at a particular time. In the event that a download was not successful, the manifest file 118 may indicate information regarding the failure. If a file is deleted from or changed on the cloud storage service 106, the manifest file 118 may indicate deletion or modification and the time the event occurred. Further, the manifest file 118 may be used to indicate the files that are to be downloaded by the downloader application 114, such that other files stored by the cloud storage service 106 that are not to be downloaded by the downloader application 114 remain in the cloud storage service 106.

The manifest file 118 may be modified by any software that has access to the cloud storage service 106. For example, the uploader application 110 may modify the manifest file 118 to add a file when it uploads the file to the cloud storage service 106. Subsequently, the downloader application 114 may modify the manifest file 118 to indicate that the file was successfully downloaded. Both the uploader application 110 and downloader application 114 may periodically check the manifest file 118 for updates. The manifest file 118 may be periodically purged to remove information about files that have been deleted.

The manifest file 118 may be application-specific. For example, there may be one manifest file 118 for a backup application and a second manifest file 118 for a security camera application. The manifest file 118 may be in a format such as an extensible markup language (XML) format, or any format that is readable by the uploader application 110 and the downloader application 114. The manifest file 118 may be encrypted so that only certain applications can access its contents.

The cloud storage service 106 may also store a communications file 120. The communications file 120 may be accessed and modified by both the uploader application 110 and the downloader application 114. The communications file 120 may be used as a medium to allow the uploader application 110 and the downloader application 114 to exchange general messages. For example, in an application where the cloud storage service 106 is used to store video content generated by a home security camera to be downloaded by a remote computer or mobile device, the communications file 120 may be used to exchange control messages between the first computing device 102 and the second computing device 104. The security camera may update the communication file 120 with certain status information, for example information concerning whether the camera is currently functioning properly. The remote computer or mobile device may update the communications file 120 with an instruction to the security camera, for example an instruction to power cycle. The communications file 120 may be used to implement any type of message passing protocol between the uploader application 110 and the downloader application 114.

The communications file 120 may also be application-specific. The communications file 120 may in a format such as an extensible markup language (XML) format, or any format that is readable by the uploader application 110 and the downloader application 114. The communications file 120 may be encrypted so that only certain applications can access its contents. In some embodiments, the communications file 120 and the manifest file 118 may be the same file.

Figure 2:
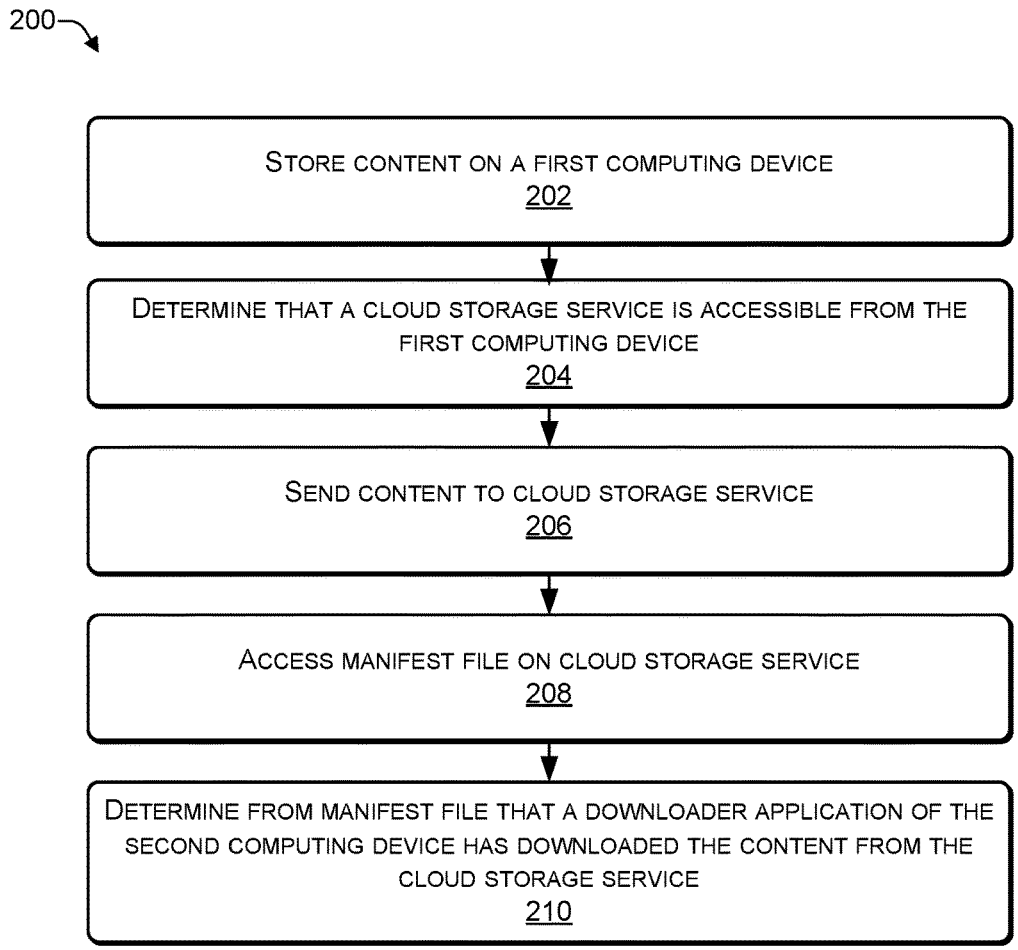
FIG. 2 is a flowchart of a process that includes sending content to a cloud storage service, according to some examples.

FIG. 2 is a flowchart of a process 200 that includes sending content to a cloud storage service, such as the cloud storage service 106 of FIG. 1. The process 200 starts at operation 202, in which content is stored on a first computer. The first computer may correspond to the first computing device 102 of FIG. 1. The components described with respect to FIG. 2 may refer to the corresponding components described with respect to FIG. 1.

In operation 204, a cloud storage service 106 is determined to be accessible from the first computing device 102. This determination may be made by determining that cloud storage service software is installed on the first computing device 102. Alternatively, or additionally, an uploader application 110 executing on the first computing device 102 may access the minimal configuration information to enable the uploader application 110 to communicate with the cloud storage service 106. Such information may include, for example, a saved login for the cloud storage service 106 and any usage restrictions or storage limits for the cloud storage service 106. Alternatively, or additionally, the uploader application 110 may attempt to connect to the cloud storage service 106 to verify that the login information is correct and the cloud storage service 106 is currently accessible.

Several processing operations may be performed on the content before the content is uploaded to the cloud storage service 106. For example, the uploader application 110 may determine that the content comprises a file that is too large to fit on the cloud storage service 106, based at least partly on the storage limits of the cloud storage service 106 or the currently available capacity of the cloud storage service 106. This information may be obtained using API calls provided by the cloud storage service 106. If the file is too large, the uploader application 110 may divide the file into a plurality of portions, each small enough to fit on the cloud storage service 106, so that the file may be uploaded and downloaded in piecemeal. During the division process, each portion may be encoded with an identifier for the large file, the total number of portions associated with the content, and a unique sequence number for each portion. Using this information, the portions can be reassembled to recreate the original file.

Another processing operation that may be performed is data compression. The method of compression may be based on the type of the content. For example, some types of files, such as JPEG files, are already in compressed form, and are thus less susceptible to certain compression methods. The uploader application 110 may determine the type of the content from the content's name, location, or file format. Based on the determined type of the content, the uploader application 110 may choose a method of data compression.

Another processing operation that may be performed is data encryption. Encryption may be achieved with a public key/private key pair which is previously distributed between the uploader application 110 and the downloader application 114. Alternatively, encryption may be achieved with a session key negotiated for a finite time period or for a finite number of transactions.

After the content is processed, in operation 206, the content is sent to the cloud storage service 106. This operation may be performed using calls from an API or according to a protocol provided by the cloud storage service 106.

In operation 208, the manifest file 118 on the cloud storage service 106 is accessed. This operation may be performed by the uploader application 110. The operation may be performed regularly, or simply each time the uploader application 110 connects to the cloud storage service 106.

In operation 210, a determination is made from the manifest file 118 that a downloader application 114 on the second computing device 104 has downloaded the content from the cloud storage service 106. This operation may be performed by the uploader application 110 on the first computing device 102. The manifest file 118 may be updated by the downloader application 114 operating on the second computing device 104 after the content is downloaded from the cloud storage service 106.

Figure 3:
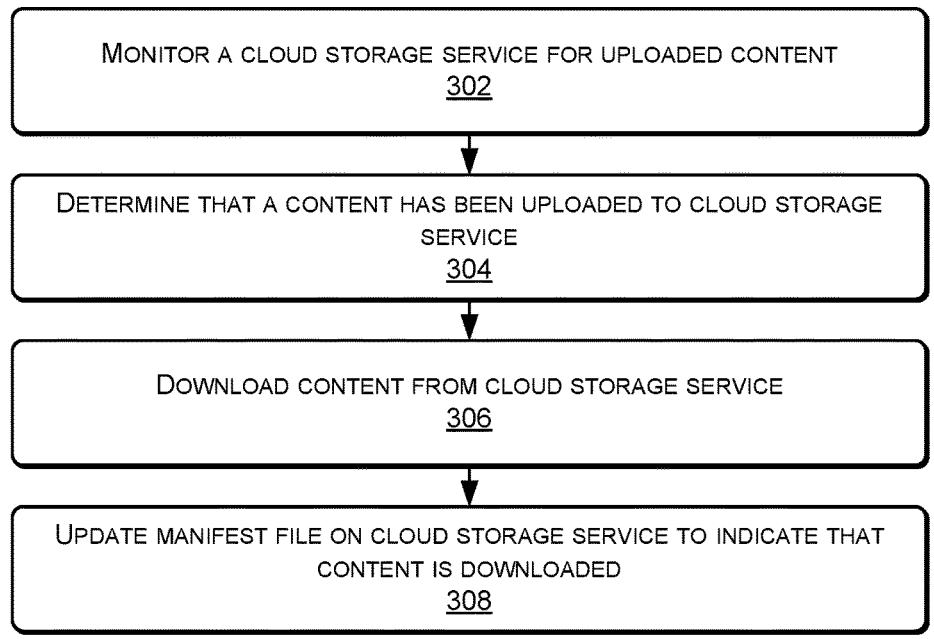
FIG. 3 is a flowchart of a process that includes downloading content from a cloud storage service, according to some examples.

FIG. 3 is a flowchart of a process 300 that includes downloading content from a cloud storage service 106. The components described with respect to FIG. 3 may refer to the corresponding components described with respect to FIG. 1.

The process 300 starts at operation 302, where a cloud storage service 106 is monitored for uploaded content. This operation may be carried out by the downloader application 114 operating on the second computing device 104. The downloader application 114 may execute as a background process or a scheduled task that is performed periodically. The downloader application 114 may connect to the cloud storage service 106 and check for any new content.

At operation 304, a determination is made that content has been uploaded to the cloud storage service 106. This operation may be performed by the downloader application 114. The downloader application 114 may examine the creation or modification timestamps of files on the cloud storage service 106 to determine whether particular files have been added or changed since the last time the downloader application 114 checked the cloud storage service 106. The downloader application 114 may perform the check using one or more API calls provided by the cloud storage service 106 or using the manifest file 118.

At operation 306, the content is downloaded from the cloud storage service 106. This operation may be performed by the downloader application 114, using a protocol or information associated with an API provided by the cloud storage service 106. The downloader application 114 may store the downloaded content in a folder on the second computing device 104, for example the folder for downloaded content 116.

At operation 308, the manifest file 118 on the cloud storage service 106 is updated to indicate that the content was downloaded. This operation may be performed by the downloader application 114. The manifest file 118 may be modified to indicate whether the download was deemed successful. For example, the uploader application 110 may compute a hash code based on the contents of an uploaded file, and write the hash code to the manifest file 118. When the file is downloaded, the downloader application 114 may compute the hash code again from the downloaded file, and compare the computed hash code with the hash code in the manifest file 118. If the two hash codes differ, this may indicate that contents of the file changed either during the upload or the download. In that case, the manifest file 118 may update the manifest file with an entry indicating that the download was not successful.

Figure 4:
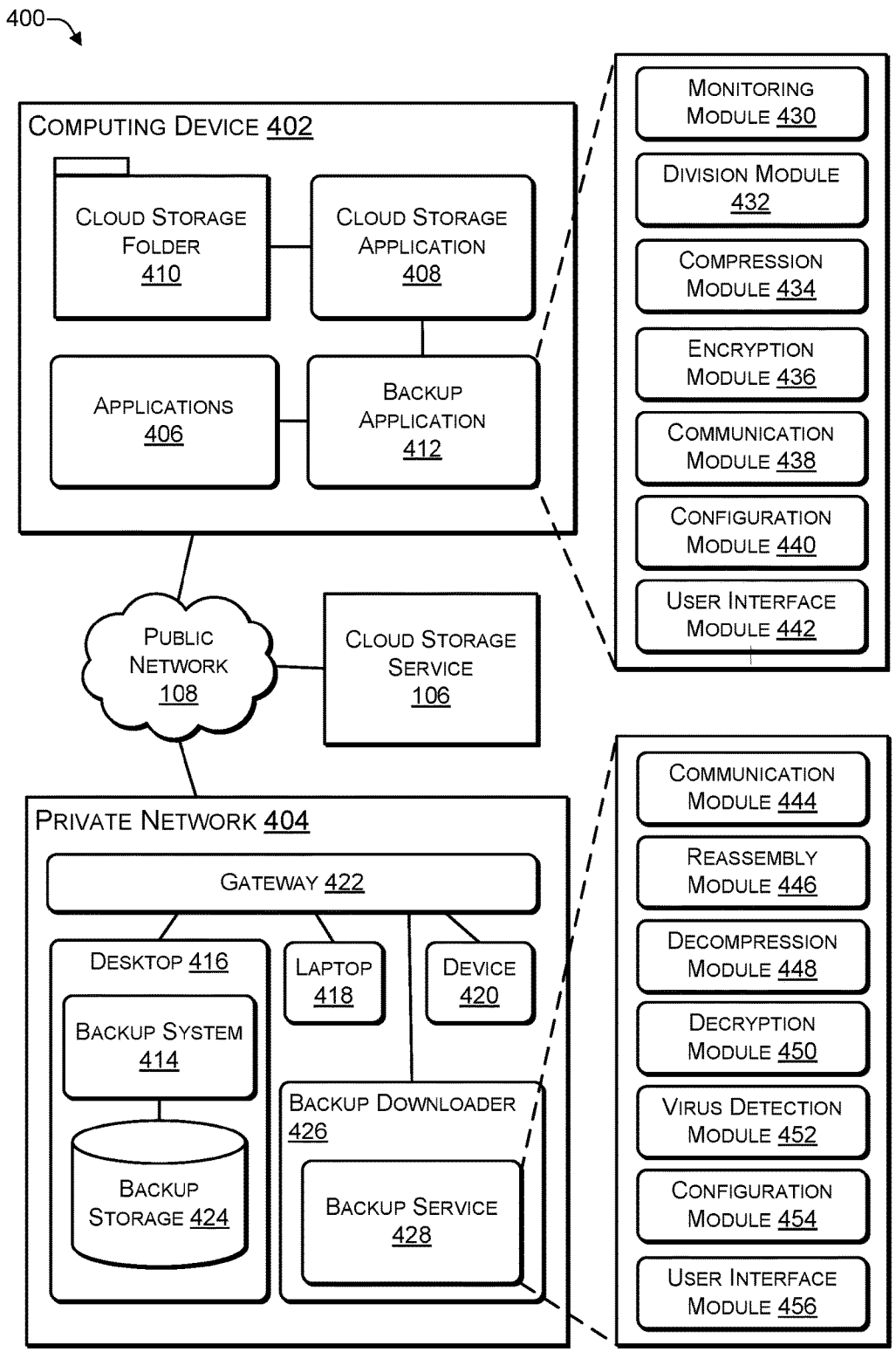
FIG. 4 is a block diagram illustrating a computing system that includes a backup system located in a private network, according to some examples.

FIG. 4 is a block diagram illustrating a computing system 400 that includes a computing device 402, a private network 404, and cloud storage servers that implement a cloud storage service 106. The computing device 402 may be any one of different types of devices. For example, the computing device 402 may be a mobile device (e.g., a smartphone, tablet, laptop, smart glasses, or vehicle-based computer system), a personal computer (e.g., a work desktop), or any other suitable device and may vary in size, shape, performance, functionality, and price. The computing device 402 may include a memory such as random access memory (RAM), read-only memory (ROM), and/or other types of non-transitory storage media or memory devices. The computing device 402 may include one or more processors such as a central processing unit (CPU) and/or hardware or software control logic. Additional components of the computing device 402 may include one or more storage devices, one or more network interfaces for communicating with external networks as well as various input and output (I/O) devices.

The computing device 402 may include a number of applications 406 to support the operation of the computing device 402. For example, applications 406 may include applications that download content to the computing device 402, such as email applications, web browsing applications, and messaging applications. Applications 406 may also include applications that capture or generate content stored on the computing device 402, such as camera applications, audio recording applications, or word processing applications. The applications 406 may be apps for a mobile device or client applications for a desktop computer.

The computing device 402 may include a cloud storage application 408 that may be used to access storage provided by a cloud storage service 106. The cloud storage application 408 may be an app for a mobile device or a client application for a desktop computer that is provided by a cloud storage service provider. The cloud storage application 408 may expose to the user a cloud storage folder 410, which allows user data that is stored on the cloud storage service 106 to be accessed by the computing device 402. The cloud storage application 408 may enable the user to create, delete, upload, and download data on, to, and from the cloud storage service 106. Moreover, the cloud storage application 408 may provide an application programming interface (API) that allows other software programs to communicate with the cloud storage service 106.

The computing device 402 may include a backup application 412 that may be used to back up content stored on the computing device 402 to a backup system 414 in the private network 404. The backup application 412 may be an app for a mobile device or a client application for a desktop computer.

The private network 404 may comprise one or more computer systems and related equipment that are not directly accessible via the public network 108. For example, the private network 404 may include computers or devices such as desktop 416, laptop 418, and device 420. The private network 404 may include a gateway 422, which may act as an access point for desktop 416, laptop 418, and device 420 to communicate with the public network 4108. The gateway 422 may also act as a router to route network traffic from public network 108 to desktop 416, laptop 418, and device 420, or a switch to enable to desktop 416, laptop 418, and device 420 to communicate with each other. The gateway 422 may host a firewall program. The firewall program is a network security program that can be used to monitor incoming network traffic into the private network 404, and reject incoming traffic that are not approved. Thus, computer systems in the private network 404, such as desktop 416, laptop 418, and device 420 are not generally accessible from computer systems outside of the private network 404.

The backup system 414 may be included in the private network 404 and the backup system 414 may be hosted on a computer system in the private network 404, such as the desktop 416. The backup system 414 may allow content to be backed up to and restored from a backup storage 424. The backup storage 424 may comprise many types of storage devices and equipment, for example hard drives, disk arrays, tape devices, network-attached storage (NAS) systems, storage area network (SAN) systems, or any combination thereof. Backup storage 424 may be dedicated to a particular computer or shared between multiple computers.

Although the backup system 414 is shown in FIG. 4 to be hosted on desktop 416, it may be hosted on other computer systems in the private network 404. For example, the computer systems in the private network 404 may implement a peer-to-peer backup system, in which the storage of all participating computer systems may be used to back up content from any participating computer system. One example of a backup system is described in co-pending U.S. patent application Ser. No. 15/248,998 to Danilo O. Tan et al., entitled Systems and Processes for Data Backup and Recovery filed on Aug. 26, 2016, which is incorporated by reference herein.

The private network 404 may comprise a backup downloader 426 that may be used to host a backup service 428. The backup downloader 426 may be any computer located inside the private network 404. In an embodiment, backup downloader 426 is a computer that is always powered on and ready to download content. The backup downloader 426 may change from computer to computer in the private network 404. In this way, if a primary backup downloader fails or is powered off, a secondary backup downloader can take over as the backup downloader 426. The preference order of computers that will take over as the backup downloader 426 may be specified by a user. The preference order may be specified via one or more user interfaces associated with the backup service 428 and stored by the backup downloader 426. Although the backup service 428 and the backup system 414 are shown in FIG. 4 to reside on two separate computers, they may reside on the same computer in other embodiments. The backup service 428 may also reside on any computer in the private network 404 other than the backup downloader 426.

The backup service 428 may be run as a background process or a scheduled task to periodically check for, download, and backup content from the cloud storage service 106 to the backup system 414. In one embodiment, the backup service 428 may periodically check for new content that has been uploaded to a particular folder on the cloud storage service 106. The folder may be specific to the computing device 402. The backup service 428 may determine from the creation or modification timestamps of files in the folder that certain files have been added or changed since the last time the backup service 428 checked the cloud storage service 106. If new or changed content is detected, the backup service 428 may download that content to a local folder on the backup downloader 426. The backup downloader 426 and the backup service 428 may not be directly accessible by software programs outside of the private network 404.

Alternatively, the selection of the backup downloader 426 may be performed programmatically and dynamically based on the capabilities of the computers in the private network 404. For example, the computers 416, 418, and 420 in the private network 404 may be ranked according to a fitness of the computing devices to act as the backup downloader 426. The ranking may be based on properties of the computers to determine fitness scores for each computer based on the properties of each computer. In illustrative implementations, the properties used to determine the fitness scores may include the type of the computer (e.g., desktop, laptop, or tablet), the type of operating system installed on the computer, the amount of time that the computer is connected to the private network 404, the amount of time that the computer is powered on, the average CPU utilization of the computer, the amount of dedicated storage of the computer, or combinations thereof. The criteria used to determine fitness scores for computers may be specified by a user via one or more user interfaces and stored by the backup downloader 346.

Returning to the computing device 402, the backup application 412 on the computing device 402 may comprise one or more software modules. These modules may include a monitoring module 430, a division module 432, a compression module 434, an encryption module 436, a communication module 438, a configuration module 440, and a user interface module 442.

The monitoring module 430 may be used to monitor content being stored on the computing device 402 and determine whether a backup of content should be initiated. The division module 432 may be used to divide content into multiple portions, so that the portions of the content may be uploaded to the cloud storage service 106 piecemeal. The operations performed by the division module 432 may be utilized to back up a file that exceeds an amount of storage for a particular cloud storage service 106. In that case, the file can be divided into portions that are less than the storage limit for individual files stored on the cloud storage service 106. The compression module 434 may be used to compress a content to a smaller size. The compression module 434 may select a compression algorithm based on the type of the content. The encryption module 436 may be used to encrypt a content so that it is not decipherable by the public. The encryption module 436 may employ any encryption methodology, including a public key/private key pair, or a session key negotiated for a finite time period or for a finite number of transactions. The communication module 438 may be used to send and receive messages to and from the backup service 428 in the private network 404. This communication may be carried out using a manifest file, such as the manifest file 118 of FIG. 1, or a communications file, such as the communications file 120 of FIG. 1, stored by the cloud storage service 106. The configuration module 440 may be used to receive and apply user configurations to the operation of the backup application 412. Finally, the user interface module 442 may be used to generate one or more user interfaces that present information to and receive input from the user of the computing device 402. For example, the user interface module 442 may generate one or more user interfaces to be used to manually initiate a backup of a content, specify an ongoing backup of particular types of content, or view the progress of pending backups.

Returning to the backup downloader 426, the backup service 428 on the backup downloader 426 may comprise one or more software modules. These modules may include a communication module 444, a reassembly module 446, a decompression module 448, a decryption module 450, a virus detection module 452, a configuration module 454, and a user interface module 456.

The communication module 444 is a counterpart to the communication module 438 of the backup application 412, and may be used to send and receive messages to and from the backup application 412 on the computing device 402. The reassembly module 446 is a counterpart to the division module 432 of the backup application 412, and may be used to reassemble the multiple portions of a large file downloaded from the cloud storage service 106 into the original file. The decompression module 448 is a counterpart to the compression module 434 of the backup application 412, and may be used to decompress content that was compressed by the compression module 434. The decompression module 448 may detect the compression algorithm used to compress the content, and apply the appropriate decompression algorithm. The decryption module 450 is a counterpart to the encryption module 436 of the backup application 412, and may be used to decrypt a content that was encrypted by the encryption module 436. The virus detection module 452 may be used to detect a potential virus, malware, or other harmful or undesirable content from any content downloaded from the cloud storage service 106, which may be rejected from the backup system 414. The virus detection module 452 may maintain a list of currently known malware or viruses, and scan downloaded content for any patterns that match the list of currently known malware of viruses. The configuration module 454 may be used to receive and apply user configurations to the operation of the backup service 428. Finally, the user interface module 454 may be used to generate one or more user interfaces that present information to and receive input from the user. For example, the user interface module 454 may produce one or more user interfaces that may be used to view or manage pending backups.

It is generally understood that the components depicted in FIG. 4 may be used for other data transfer applications, and are not limited backing up content on a computing device. As one example, the cloud storage service 106 may be used to temporarily store video files generated by a home security camera. The security camera may generate a constant stream of video files, which may be periodically uploaded to the cloud storage service 106. A remote computer may periodically check the cloud storage service 106 for uploaded video files. When new video files are detected, the remote computer may download the new video files. The remote computer may update a manifest file, such as the manifest file 118 of FIG. 1, stored by the cloud storage service 106 to indicate that particular video files have been downloaded. The security camera may subsequently access the manifest file. If the manifest file indicates that a video file has been downloaded to the remote computer, the security camera may delete the copy of the video file stored locally and/or the copy of the video file stored on the cloud storage service 106. In this fashion, the security camera may transfer large volumes of content to the remote computer over time, without having to directly communicate with the remote computer.

The cloud storage service 106 may also store a communications file, such as the communications file 120 of FIG. 1, to allow the security camera and the remote computer to conduct other communications. The security camera may update the communications file to indicate its operational status or other information. For example, the security camera may indicate in the communications file that it is experiencing certain errors, so that the remote computer may receive that information and alert a user about the errors. The remote computer may update the communications file with instructions for the security camera. For example, the remote computer may add an instruction to the security camera to power cycle. This instruction may be received by a controller that controls the security camera, which may carry out the instruction. The communications file may be application-specific. In some embodiments, the communications file and the manifest file may be the same file. A person of ordinary skill in the art would appreciate that the communications file may be used to implement many types of communications protocol, which are not limited to the specific examples discussed herein.

Figure 5:
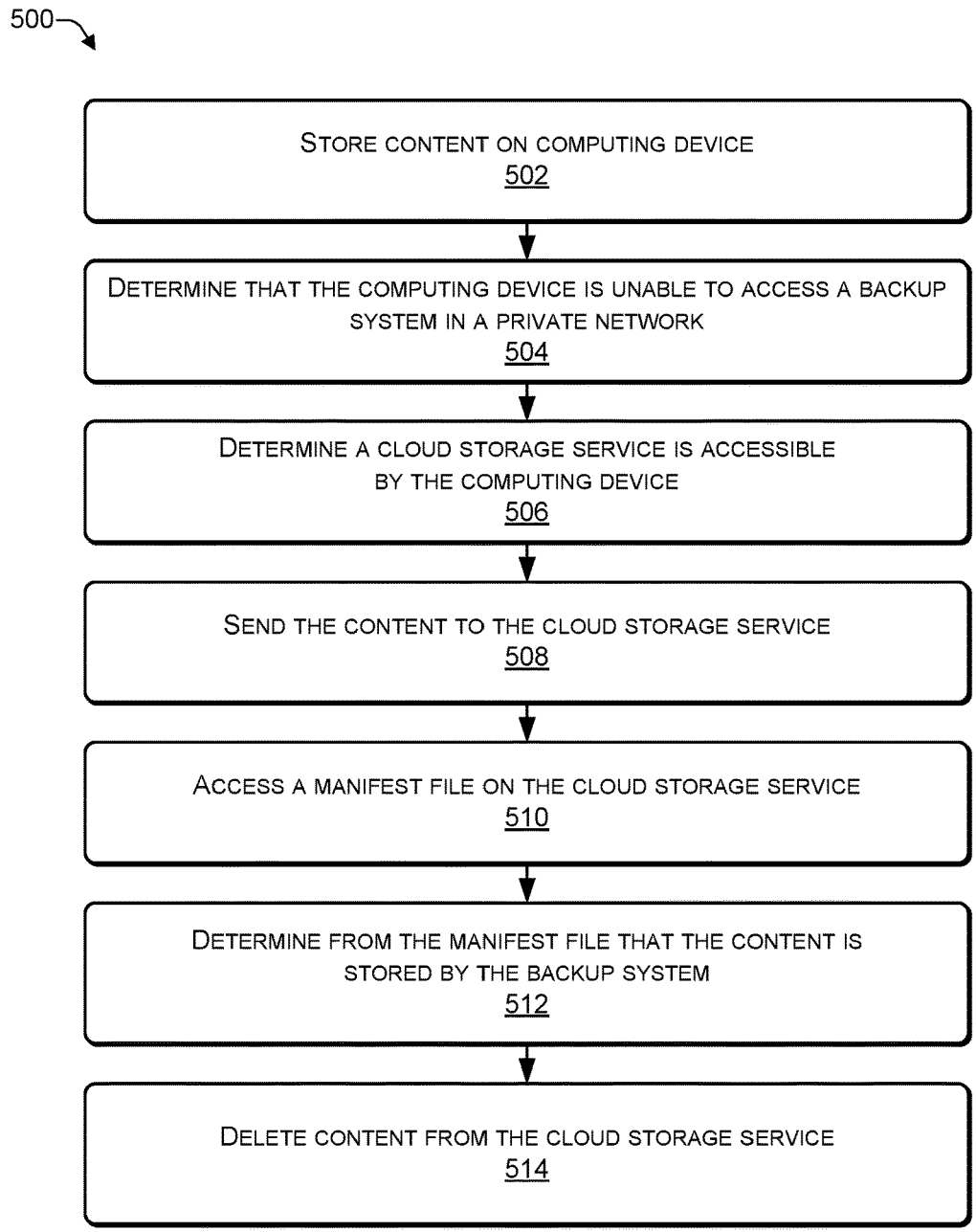
FIG. 5 is a flowchart of a process that includes sending content to a cloud storage service to be backed up, according to some examples.

FIG. 5 is a flowchart of a process 500 that includes sending content to a cloud storage service to be backed up, according to some examples. The process may be carried out by computing device 402. The operations of the process 500 may be described with reference to the components included in FIG. 4.

The process 500 starts at operation 502. In operation 502, a content is stored on the computing device 402. The content may be data that the user wishes to back up, for example a photo, a video, an audio file, or a document.

At operation 504, a determination is made that the computing device 402 is not able to access a backup system 414 in a private network 404. This may occur when the computing device 402 is operating outside of the private network 404, which may implement a firewall to reject network traffic from devices outside the firewall. In some cases, the computing device 402 may be unable to access the private network 404 because the computing device 402 is unable to communicate with the gateway 422.

The determination that the computing device 402 is not able to access the backup system 414 in the private network 404 may be made by a number of methods. For example, the backup application 412 may detect that the computing device 402 is currently accessing a network access point, such as a router or a local area wireless (e.g., WiFi) access point, which is known to be outside of the private network 404. For example, backup application 412 may determine that the computing device 402 is currently connected to a router at the user's workplace, which is outside of the private network 404 of the user's home that contains the backup system 414. Alternatively, backup application 412 may make the determination based on determining that the currently connected network access point is not known to be an access point associated with the private network 404. For example, the computing device 402 may store an identifier associated with a network access point in the private network 404 and determine that an identifier of a network access point that the computing device 402 is currently connected to does not correspond with the identifier of the private network 404. As another example, backup application 412 may determine from a Global Positioning System (GPS) module on the computing device 402 that the device is in a physical location where the computing device 402 is unable to access the private network 404.

If it is determined that the computing device 402 cannot currently access the private network 404, backup application 412 may proceed to operation 506 to check if any cloud storage services 106 can be used to back up the content. On the other hand, if it is determined that the computing device 402 can access the private network 404, the backup application 412 may communicate directly with the backup system 414 to initiate the backup.

Additionally, determining that the cloud storage service 106 is accessible from the device may include determining that the computing device 402 is able to access a cloud storage service 106. This determination may be made by examining whether cloud storage service software is installed on the computing device 402. Alternatively, or additionally, the backup application 412 may verify that the configuration module 440 contains the minimal configuration information to allow the backup application 412 to communicate with the cloud storage service 106. Such information may include, for example, a saved login for the cloud storage service 106 and any usage restrictions or storage limits for the cloud storage service 106. Alternatively, or additionally, backup application 412 may attempt to connect to the cloud storage service 106 to verify that the login information is correct and the cloud storage service 106 is currently executing. After this operation, the backup process may begin.

The backup process may be initiated in two ways: manually or programmatically. In the case of a manual backup, a user may invoke a command through one or more user interfaces generated by the user interface module 442 of the backup application 412 to initiate the backup.

In the case of a programmatic backup, the backup application 412 may run as a background process or scheduled task that continually monitors for the storing of particular types of content on the computing device 402. The monitoring may be performed by the monitoring module 430 of the backup application 412. When content of a type specified by the user for backup is detected, the backup application 412 may check whether the current conditions satisfy certain user-specified conditions for initiating the backup. The conditions may include, for example, the time of day, the remaining storage capacity of the computing device 402, whether the computing device 402 is idle, whether the computing device 402 is plugged in to a power source, among other things. If the conditions are satisfied, a backup of the content is initiated. The content types and conditions for the programmatic backups may be maintained and enforced by the configuration module 440 of the backup application 412. In an example, the backup application 412 may determine that the computing device 402 is storing voicemail content and that the user has specified that voicemail content is to be backed up. In this situation, the backup application 412 may determine that the video content is to be sent to the cloud storage service 106.

Several processing operations may be performed before the content is uploaded to the cloud storage service 106. For example, the backup application 412 may determine that the content comprises a file that is too large to fit on the cloud storage service 106, given storage limits for files stored by the cloud storage service 106 or the currently available capacity of the cloud storage service 106. This information may be obtained using information associated with an API provided by the cloud storage service 106. If the file is too large, backup application 412 may divide the file into a plurality of portions, each small enough to fit on the cloud storage service 106, so that the file may be uploaded and downloaded in piecemeal. In some cases, the portions of the file may be sent to the cloud storage service 106 at various times as the storage capacity of the cloud storage service 106 changes and allows more or less storage for files. This division process may be carried out by the division module 432 of the backup application 412. During the division process, each portion may be encoded with an identifier for the large file, the total number of portions associated with the content, and a unique sequence number for each portion. Using this information, the portions can be reassembled to recreate the original file.

Another processing operation that may be performed is data compression. The data compression process may be carried out by the compression module 434 of the backup application 412. The method of compression may be based on the type of the content. For example, some types of files, such as JPEG files, are already in compressed form, and are thus less susceptible to certain compression methods. The compression module 434 may determine the type of the content from the content's name, location, or file format. Based on the determined type, the compression module 434 may choose a method of data compression.

Another processing operation that may be performed is data encryption. The data encryption process may be carried out by the encryption module 436 of the backup application 412. Encryption may be achieved with a public key/private key pair which is previously distributed between the backup application 412 and backup service 428. Alternatively, encryption may be achieved with a session key negotiated for a finite time period or for a finite number of transactions.

After the processing operations, at operation 508, the content is sent to the cloud storage service 106. This operation may be performed using an API or protocol provided by the cloud storage service 106.

At operation 510, a manifest file located on the cloud storage service 106 may be accessed. The manifest file may include information regarding the actions that are performed on content that is uploaded to the cloud storage service 106. For example, the manifest file may indicate that a particular file was successfully downloaded by the backup service 428 at a particular time, or that the file was successfully backed up by the backup system 414 at another particular time. In the event that the download and/or backup was not successful, the manifest file may indicate information regarding the failure. If a file is deleted from or changed on the cloud storage service 106, the manifest file may indicate that the file was deleted or changed and the time the event occurred.

The backup application 412 may periodically check the manifest file for updates from the backup service 428.

At operation 512, a determination is made from the manifest file that the backup service 428 has downloaded the content and the backup system 414 in the private network 404 has backed up the content.

If the manifest file indicates that the download and/or backup was successful, the backup application 412 may delete the content from the cloud storage service 106 at operation 514. In some cases, the content may also be deleted from the computing device 402 in response to determining that the content has been backed up by the backup service 428. Alternatively, the manifest file may indicate that the download and/or backup was not successful. For example, the backup service 428 may report that the content was corrupted during the transfer, that a portion of the content is lost, or that the cloud storage service 106 is not responsive. In that event, the backup application 412 may resend the content, possibly using a different cloud storage service 106.

Figure 6:
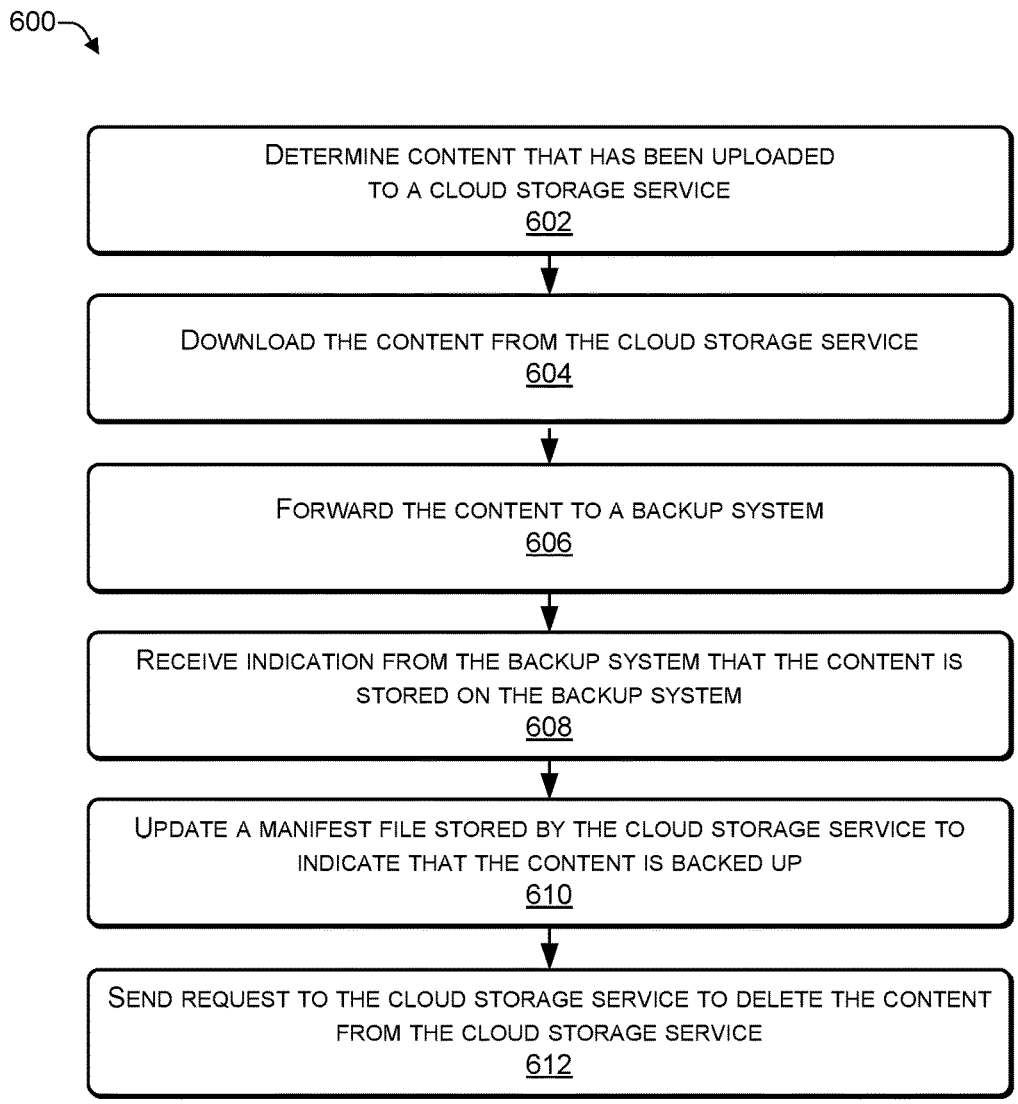
FIG. 6 is a flowchart of a process that includes downloading content from a cloud storage service to be backed up, according to some examples.

FIG. 6 is a flowchart of a process 600 that includes downloading content from a cloud storage service to be backed up, according to some examples. The process may be carried out by the backup downloader 426. The operations of the process 600 may be described in relation to the components of FIG. 4.

The process 600 starts at operation 602. In operation 602, a determination is made that content has been uploaded to a cloud storage service 106. For example, the backup service 428 may periodically log onto the cloud storage service 106 and examine the contents of a predetermined folder for new or changed files. A file that has a creation or change timestamp that is later than the last check by the backup service 428 may indicate the file is newly uploaded content. The operation may be performed programmatically using one or more calls or other information corresponding to an API provided by the cloud storage service 106.

At operation 604, the content is downloaded from the cloud storage service 106. This operation may be performed using information associated with an API or protocol provided by the cloud storage service 106.

Several processing operations may be performed after the content is downloaded from the cloud storage service 106. For example, the backup service 428 may determine that the downloaded content is one portion of a multi-portion file that was divided prior to uploading. The backup service 428 may decode the content to retrieve an identifier for the parent file, the total number of portions to be expected, and a unique sequence number for the received portion. The backup service 428 may keep each portion until all portions of the parent file are received, and then reassemble the parent file. This reassembly process may be carried out by the reassembly module 446 of the backup service 428.

Another processing operation that may be performed is data decompression. The data decompression operations may be carried out by the decompression module 448 of the backup service 428. The method of decompression may be based on the determined method of compression.

Another processing operation that may be performed is data encryption. This step may be carried out by the decryption module 450 of the backup service 428. In particular implementations, the backup service 428 may determine an encryption method used to encrypt the content and utilize a corresponding decryption method to decrypt the content.

Another processing operation that may be performed is virus or malware detection. This operation may be carried out by the virus detection module 452 of the backup service

428. The virus detection module 452 may examine the content using antivirus tools to determine whether the content is at risk for containing a virus or malware. If a high-risk content is detected, the backup service 428 may update a manifest file with an alert. The alert may provide information to the computing device 402 regarding the content and the potential risk associated with the identified malware or virus. In some cases, the backup service 428 may request, via the manifest file, that the computing device 402 confirm that the content should be backed up. Alternatively, backup service 428 may simply discard the content and indicate in the manifest file that the content has not been backed up.

After the downloaded content has been processed, at operation 606, the content may be forwarded to the backup system 414. The backup system 414 may select a backup storage device 424 to store the content. The backup system 414 may have access to multiple backup storage devices 424. The selection of a particular backup storage device 424 may be based on a number of factors, including the conditions of the backup storage devices 424. For example, a backup storage device 424 that has been experiencing an excessive number of errors or is at near full capacity may be less preferred than a backup storage device 424 that is performing within specified operating conditions. To carry out this operation, the backup service 428 may communicate with the backup system 414 via an API exposed by the backup system 414. The backup system 414 may select the backup storage device 424 for the backup service 428, based on the type of the content and/or other factors.

At operation 608, an indication is received from the backup system 414 that the content is backed up. This operation may be carried out by the backup service 428 via an API exposed by the backup system 414.

At operation 610, a manifest file located on the cloud storage service 106 is updated to indicate that the content is successfully downloaded and/or backed up. This operation may be carried out by the communication module 444 of the backup service 428 or the backup system 414. The operation may be divided into two steps. For example, the manifest file may be updated in response to the content being downloaded, and then updated again after the content is backed up. In one embodiment, the process may update two separate manifest files, one manifest file for the download, and another manifest file for the backup.

At operation 612, a request is sent to the cloud storage service 106 to delete the copy of the content stored there. Thus, the storage space on the cloud storage service 106 is available to be used for other purposes.

Instead of operations 608, 610, and 612, the backup system 414 may indicate that it cannot successfully store the content. In that case, information regarding the failure to store the content may be written to a manifest file on the cloud storage service 106. This information may later be received by the backup application 412 on the computing device 402, so that the content on the computing device 402 is not deleted prematurely. In addition, the copy of the content on the cloud storage service 106 may not be deleted. If the failure was due to a problem with a particular backup storage device 424, the backup service 428 and backup system 414 may select another backup storage device 424 to store the content, and repeat the process until the content is successfully backed up.

Figure 7:
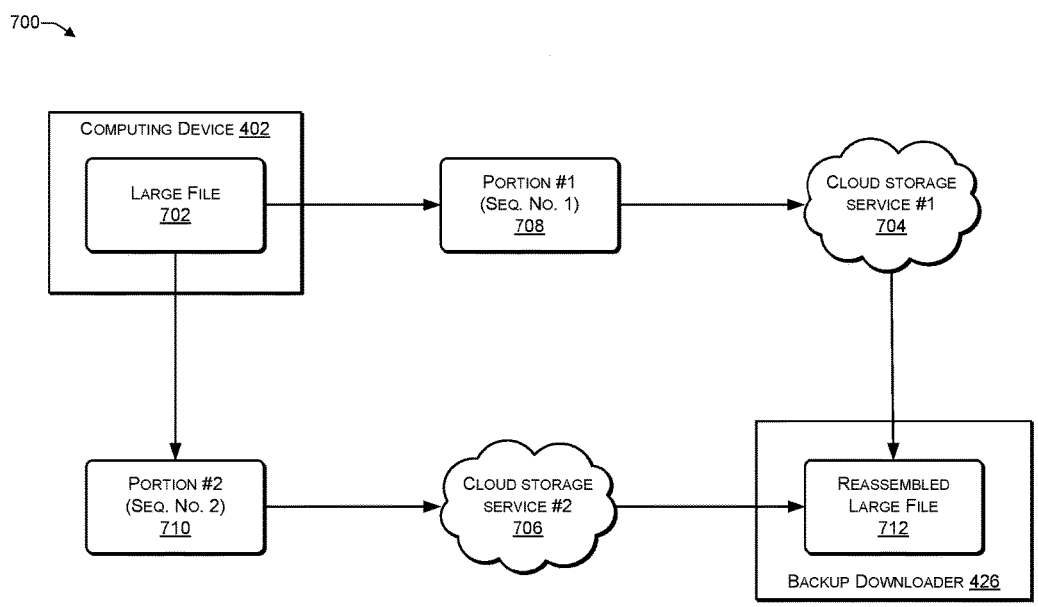
FIG. 7 is a block diagram illustrating a process that includes dividing a large file into two portions and uploading the two portions to two different cloud storage services, according to some examples.

FIG. 7 is a block diagram illustrating a process 700 that includes dividing a large file into two portions and uploading the two portions to two different cloud storage services, according to some examples.

The process 700 starts in computing device 402, where a file 702 is designated to be backed up. The file 702 may exceed a storage limit for a first cloud storage service 704. This operation may be carried out by the backup application 412 on the computing device 402. The designation may occur either manually or programmatically. In the case of a manual backup, a user may invoke a command through a user interface of the backup application 412 to designate the backup of a file. In the case of a programmatic backup, the backup application 412 may run as a background process that continually monitors for the storing of particular types of content on the computing device 402. When the backup application 412 identifies a content of a specified type, the backup application 412 may check whether the current conditions satisfy certain specified conditions for initiating the backup. If the conditions are satisfied, the content is designated for backup.

Next, the backup application 412 may determine that the file 702 is too large to fit on a first cloud storage service 704 given the storage limits of the first cloud storage service 704 or the currently available capacity of the first cloud storage service 704. The storage limit and available capacity information may be obtained via an API provided by the first cloud storage service 704. Alternatively, the backup application 412 may attempt to upload the large file 702 to the first cloud storage service 704, and receive an error message indicating that the file is too large. The backup application 412 may then parse the error message to obtain the storage limit or current capacity information.

Next, the backup application 412 may identify a second cloud storage service 706. The second cloud storage service 706 may be selected based on a number of factors, including the storage limit and current capacity of the second cloud storage service 706. In addition, the selection may be based on user preferences or a priority level for cloud storage services previously provided to the backup application 412, and stored in the configuration module 440.

Next, the large file 702 is divided into two portions, 708 and 710, in such a way that the first portion 708 is less than the storage limit of the first cloud storage service 704 and the second portion 710 is less than the storage limit of the second cloud storage service 706. During the division, both portions 708 and 710 may be encoded with an identifier associated with the large file 702, a total number of portions, and a unique sequence number for each portion. The portions may be independently compressed and/or encrypted.

Next, the first portion 708 is uploaded to the first cloud storage service 704, and the second portion 710 is uploaded to the second cloud storage service 706.

Next, the backup service 428 on the backup downloader 426 may detect and download both portions 708 and 710, and determine that the two are portions of a single large file 702. The backup service 428 may determine this based on the encoding of the portions 708, 710. For example, the backup service 428 may detect that the first portion 708 or the second portion 710 is encoded with an identifier for the large file 702, a total count of the number of portions of the file 702, and a sequence number unique to the portion 708 or 710. The backup service 428 may wait to receive all portions of the large file 702 before reassembling the large file 702. After the portions 708 and 710 are both received, the backup service 428 may decode and reassemble the portions 708 and 710 to recreate the large file 702.

Alternatively, the backup service 428 may fail to receive either portion 708 or portion 710. For example, the backup service 428 may detect that first portion 708 is corrupt, or that the first cloud storage service 704 is inaccessible so that the first portion 708 cannot be downloaded. The backup service 428 may update a manifest file to indicate that the first portion 708 was not successfully received, along with information about any errors that caused the problem. The backup application 412 may receive that information from the manifest file, and resend the problematic portion, possibly using a different cloud storage service.

Alternatively, the backup application 412 may fail to receive any indication from the backup service 428 regarding a portion 708 or 710 within a predetermined period of time. After the period of time lapses, the backup application 412 may determine that the unacknowledged portion was not successfully received by the backup service 428, and resend the missing portion using a different cloud storage service.

The technique described above is flexible in terms of the number of portions and number of cloud storage services utilized, and may be extended to any number of portions transferred through any number of cloud storage services, as the situation may call for. For example, the large file 702 may be divided into ten separate portions to be transferred to the backup system 414 using five different cloud storage services 106. Each portion may be transferred independently of other portions. In this fashion, the large file 702 may be transferred largely in parallel. In addition, this technique provides a degree of fault tolerance, such that the failure of any one cloud storage service 106 will not prevent the large file 702 from being transferred.

FIG. 8 illustrates a manifest file 800 used for the transfer of content to be backed up, according to some examples. The manifest file 800 may contain a listing of all content items that are uploaded to the cloud storage service 106 during a period of time. Each content item may be associated with one or more actions that were performed on the content item. The manifest file 800 may be periodically modified and/or accessed by the backup service 428 or the backup application 412. For example, the backup application 412 may use the manifest file 800 to determine whether content was successfully downloaded or backed up. Based on that determination, the backup application 412 may determine whether the content on the computing device 402 can be safely deleted, or whether the content should be uploaded again. As shown, the manifest file 800 may be in the form of an XML file. However, other file formats may also be used.

As shown, the root element in manifest file 800 is the "manifest" element, which is the parent element for all the "file" elements. The manifest file 800 may be application-specific, so that different applications may use different manifest files to track content on the cloud storage service 106.

In the manifest file 800, each file is represented by a "file" element. Portion 802 is one element representing a file named "image1.jpg." The file "image1.jpg" is 239K in size. A hash code may be associated with the file. This hash code may be calculated from the content of the file, and may be used to determine whether the file was corrupted during an upload operation or download operation.

As shown, a number of actions are recorded for the file "image1.jpg." For example, portion 802 indicates that "image1.jpg" was downloaded at a particular time on Feb. 3, 2016, and that the download was successful. This indication may be provided by the backup service 428. Portion 802 also indicates that "image1.jpg" was successfully backed up at a later time on the same date. This indication may be provided by the backup system 414 or the backup service 428. Finally, portion 802 indicates that "image1.jpg" was deleted from the cloud storage service 106 on the same date. Each action may be written to the manifest file 800 at different times, and by different applications. The manifest file 800 may be periodically purged so that content that has been deleted after a threshold period of time are removed from the manifest file 800.

Portion 804 shows a file "video1.mpg" that was divided into multiple portions. In this case, the first and second portions of "video1.mpg" are limited to a size of 250K. The portions have no associated actions or events. This may reflect that the backup service 428 has not completed downloading the portions.

Portion 806 shows a file "image2.jpg" that was successfully downloaded. However, portion 806 also indicates that "image2.jpg" was not successfully backed up. The "backup" element in portion 806 indicates that the backup was not completed because a "potential malware" was detected in the file. This message may have been provided by the backup system 414, and may be received by the backup application 412 on the computing device 402 when the backup application 412 checks the manifest file 800. The backup application 412 may present the message about the malware to the user via for example one or more user interfaces.

FIG. 9 is a flowchart of a process 900 that includes determining content types and conditions for an ongoing backup process and monitoring of content by the ongoing backup process, according to some examples. The process 900 may be carried out by the backup application 412 on the computing device 402. Alternatively, the process 900 may be carried out by a separate computer executing a program that has access to the configuration module 440 on the computing device 402. For example, the configuration computer may reside in the private network 404.

The process beings at operation 902, where a cloud storage service 106 for use as temporary storage for an ongoing backup is determined. The ongoing backup may be implemented as a background process or scheduled task running on the computing device 402. The ongoing backup may occur on a regular basis, for example once an hour or once a day. The ongoing backup may be a non-interactive process that does not require any user input to initiate.

Operation 902 may occur manually or automatically. For example, a user may manually configure backup application 412 via one or more user interfaces to add a cloud storage service 106 to the list of cloud storage services that may be utilized by the backup application 412 to temporarily store content. Alternatively, the computing device 402 may detect automatically that software from a known cloud storage service provider has been installed. The computing device 402 may automatically add the installed cloud storage service to the backup application 412. Alternatively, the computing device 402 may prompt the user via one or more user interfaces to verify whether to allow backup application 412 to use the installed cloud storage service.

The computing device 402 may also prompt the user via one or more user interfaces to enter certain information for the cloud storage service 106. For example, the user may be asked to enter his or her login credentials for the cloud storage service 106, any usage or storage limit information for the cloud storage service 106, a folder structure to maintain on the cloud storage service 106 for the backup application 412, among other things. The user may also be asked to specify certain user preferences for the cloud storage service 106. For example, a cloud storage service 106 may be associated with a priority level that is used by the backup application 412 to select cloud storage services 106 for a backup. A user may assign a high priority level to a cloud storage service 106 that is preferred for use as a temporary storage for backup data, and a low priority level to another cloud storage service 106 that is less preferred. For example, the user might not prefer a particular cloud storage service 106 because it is less secure, has a loose privacy policy, or is heavily used for other purposes.

At operation 904, the content types for the ongoing backup are determined. This operation may be carried out via one or more user interfaces. In this operation, the user may specify particular types of content on the computing device 402 that will be backed up by the ongoing backup. For example, the user may specify that video files larger than 1 MB in size will be automatically backed up. As another example, the user may specify that any file more than one week old located in an email attachments folder for an email app should be backed up. As another example, the user may specify that certain files, such as files in a browser cache folder or image files of small sizes, should not be backed up.

At operation 906, the conditions for the ongoing backup are determined. This operation may be carried out via one or more user interfaces. Alternatively, the conditions may be pre-set as default conditions for ongoing backups. Alternatively, the conditions may be created and adjusted using machine learning techniques and based on detected usages patterns of the computing device 402.

The conditions for the ongoing backup specify particular situations under which the ongoing backup may occur. For example, the user may specify that ongoing backups may occur at regular intervals, for example weekly, daily, or hourly. The user may specify that an ongoing backup may be initiated when a particular folder on the computing device 402 reaches a certain size limit, or when the overall storage utilization of the computing device 402 reaches a threshold level. The user may specify that ongoing backups should occur at night, or during periods of low activity of the computing device 402. The user may specify that ongoing backups occur when the computing device 402 is plugged in to a power source. On the other hand, the user may specify that ongoing backups may not occur when the computing device 402 is not plugged in, or when the computing device 402 is moving. The movement of the computing device 402 may be determined using the device's connections with network access points, GPS, or other means.

Operations 902, 904, and 906 may entail the specifying of configuration information that govern the ongoing backup of content: the cloud storage service 106 to use for the backup, the content types to back up, and the conditions for a backup. This configuration information may be viewed and modified using one or more user interfaces. The configuration information may be stored by the configuration module 440. The configuration information may be stored as configuration files, which may themselves be backed up to the backup system 414.

At operation 908, the computing device 402 is monitored for stored content. This operation may be carried out by the monitoring module 430 of the backup application 412. The monitoring module 430 may periodically check particular locations on the computing device 402 for new content. For example, the monitoring module 440 may periodically check the data folder associated with a camera app installed on the computing device 402. New content may include for example, photographs or audio/video recordings captured with the computing device 402, multimedia files downloaded as email or text attachments, or documents that are created by the user on the computing device 402, among other things.

At operation 910, storage of content that is of a content type specified for the ongoing backup is detected. This operation may be carried out by the monitoring module 430 of the backup application 412.

At operation 912, a determination is made whether the current conditions satisfy conditions specified for the ongoing backup. This operation may be carried out by the monitoring module 430 and configuration module 440 of the backup application 412. Current conditions may be determined from a variety of sources. For example, computing device 402 may include a clock module that provides the current time. The computing device 402 may include a network interface and associated software that is able to report its current connections to network access points. The computing device 402 may include a GPS unit that can provide the current physical location of the device. The computing device 402 may include a variety of hardware sensors and associated software interfaces to provide state information such as the current CPU utilization, storage utilization, power status of the device, etc. These current conditions are compared with the conditions that have been specified for the ongoing backup to determine whether a backup is to take place. If the current conditions satisfy the conditions specified for the ongoing backup, the process proceeds to operation 914. If the current conditions do not satisfy the conditions specified for the ongoing backup, the backup application 412 may place the content in a queue to be backed up at a later time, when the conditions are satisfied. Alternatively, the backup application 412 may schedule the content to be backed up at a later time.

At operation 914, the content to be backed up is sent to a cloud storage service 106. This operation may be carried out by the backup application 412. The cloud storage service 106 may include the cloud storage service determined in operation 902. The backup application 412 may select another cloud storage service 106 that is accessible from the computing device 402, either in place of or in addition to the cloud storage service determined in operation 902.

FIG. 10 illustrates a user interface for viewing and configuring an ongoing backup of content. View 1000 depicts a dialog or window that may be displayed as part of a user interface produced by the user interface module 442 of the backup application 412. View 1000 includes display elements and control elements that allow a user to view and configure an ongoing backup. One or more ongoing backups may be configured using view 1000.

In portion 1002 of the view 1000, the content types of the ongoing backup may be viewed and configured. For example, in the illustrative view 1000, the user may define a content type called "old email attachments" that may be included in the ongoing backup. Content of the type "old email attachments" may be located in an app folder associated with an email app installed on the computing device 402. The file types that are to be included in the ongoing backup may include images, videos, and presentations. The view 1000 may also allow the user to specify that only files older than one month are to be included in the ongoing backup. The "old email attachments" content type may be added to one or more other content types to be included in the ongoing backup. Other content types may include documents associated with other apps such as voicemails, work documents, or photographs.

In portion 1004 of the view 1000, the cloud storage services 106 for the ongoing backup may be viewed and configured. For example, in the illustrative view, a user may define a cloud storage service under the name "Cloud Storage 1." The "Cloud Storage 1" cloud storage service 106 may specify a cloud storage service type that refers to a particular cloud storage service client software installed on the computing device 402. Other information about the cloud storage service 106 may also be specified via the view 1000. This information may include for example the login credentials for the cloud storage service 106, the maximum storage limit for the cloud storage service 106, and a priority level assigned to the cloud storage service 106. The priority level may indicate a level of preference of the user for the particular cloud storage service 106, and be used by the backup application 412 to select a cloud storage service 106 for a backup. Portion 1004 of the view 1000 also includes a "More Settings" button which may be clicked to display additional settings for the cloud storage service 106. For example, some of the additional settings may specify whether content should be encrypted or compressed before they are uploaded. Some of the additional settings may be specific to the type of the selected cloud storage service 106. The "Cloud Storage 1" cloud storage service may be added to one or more other cloud storage services to be included for the ongoing backup. The other cloud storage services may be provided by different cloud storage service providers. The computing device 402 may have access to multiple user accounts on a single cloud storage service provider, and the multiple accounts may be added as separate options to the ongoing backup. Cloud storage services 106 may also include custom cloud storage solutions, such as a personal File Transfer Protocol (FTP) service. In the illustrative view 1000, the priority level of each cloud storage service 106 for the ongoing backup is displayed next to the respective cloud storage service 106.

In portion 1006 of the view 1000, the conditions for the ongoing backup may be viewed and configured. For example, in the illustrative view 1000, a user may specify a condition that the ongoing backup can occur when the power of the computing device 402 is greater than or equal to 10%. Thus, the ongoing backup will not be active when the computing device 402 is critically low on battery power. The conditions may be specified using expressions that can be assembled from picklists and buttons. The expressions may be aggregated together using logical boolean operators. In the illustrative view 1000, the aggregated expression appears in a text area, whose contents may be modified by directly typing into the text area on the right side of portion 1006. Clicking the "Save" button on the top right corner of view 1000 will save the ongoing backup specified in view 1000 and initiate the monitoring of content specified for the ongoing backup.

Figure 11:
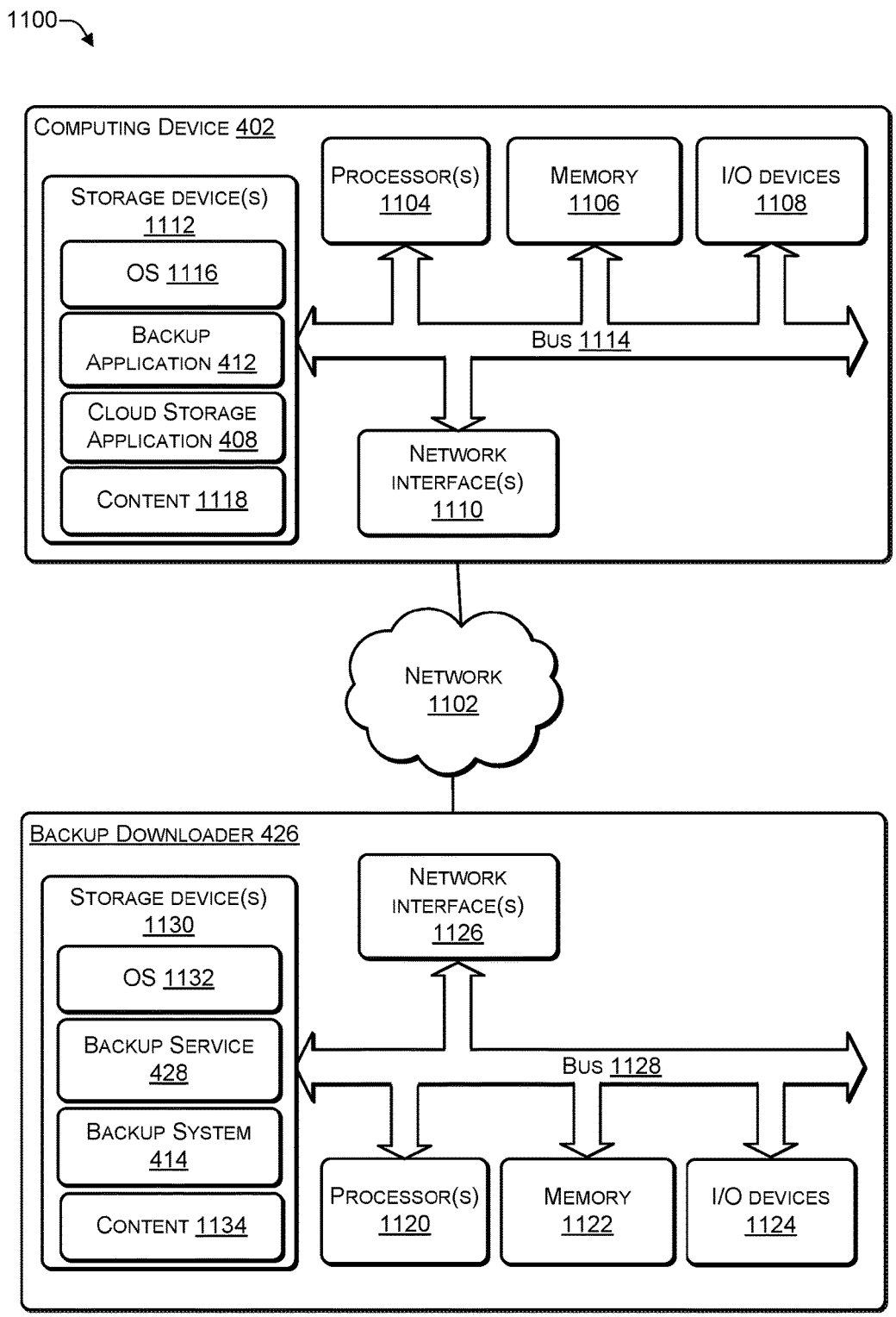
FIG. 11 illustrates an example configuration of a computing device and a backup downloader that can be used to implement the systems and techniques described herein.

FIG. 11 illustrates an example configuration of a computing device and a backup downloader that can be used to implement the systems and techniques described herein, such as the computing device 402 and backup downloader 426 of FIG. 4. The computing device 402 may include at least one processor 1104, a memory 1106, other input/output (I/O) devices 1108, network interfaces 1110, and one or more storage devices 1112, configured to communicate with each other, such as via a system bus 1114 or other suitable connection.

The processor 1104 may include a hardware device that may include a single processing unit or a number of processing units, all of which may include single or multiple computing units or multiple cores. The processor 1104 can be implemented as one or more microprocessors, microcomputers, microcontrollers, digital signal processors, central processing units, state machines, logic circuitries, and/or any devices that manipulate signals based on operational instructions. Among other capabilities, the processor 1104 can be configured to fetch and execute computer-readable instructions stored in the memory 1106, mass storage devices 1112, or other computer-readable media.

Memory 1106 and storage devices 1112 are examples of computer storage media (e.g., memory storage devices) for storing instructions which are executed by the processor 1104 to perform the various functions described above. For example, memory 1106 may generally include both volatile memory and non-volatile memory (e.g., RAM, ROM, or the like) devices. Further, storage devices 1112 may include hard disk drives, solid-state drives, removable media, including external and removable drives, memory cards, flash memory, floppy disks, optical disks (e.g., CD, DVD), a storage array, a network attached storage, a storage area network, or the like. Both memory 1106 and storage devices 1112 may be collectively referred to as memory or computer storage media herein, and may be a media capable of storing computer-readable, processor-executable program instructions as computer program code that can be executed by the processor 1104 as a particular machine configured for carrying out the operations and functions described in the implementations herein.

The input/output (I/O) devices 1108 are devices that enable the computing device 402 to interact with its environment, including a user of the computing device 402. I/O devices 1108 include for example, a display device to display information to a user and a keyboard or a touch screen to receive user input.

The computing device 402 may include one or more network interfaces 1110 for exchanging data via the network 1102 with for example the private network 404. The network interfaces 1110 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Network interfaces 1110 can provide communication with external storage (not shown), such as in a storage array, network attached storage, storage area network, or the like.

The storage devices 1112 may include an operating system 1116 (OS), the backup application 412, the cloud storage application 408, and content 1118 to be backed up. The operating system 1116 may be system software that manages computer hardware and software resources and provides common services for computer programs that operate on the computing device 402. The operating system 1116 may be for example a version of the Android, iOS, or Windows operating system.

The backup downloader 426 may include one or more computers connected to the network 1102. Each computer may include at least one processor 1120, a memory 1122, other input/output (I/O) devices 1124, network interfaces 1126, and one or more storage devices 1130, configured to communicate with each other, such as via a system bus 1128.

In the backup downloader 426, the storage devices 1130 may include different software, including an OS 1132, the backup service 428, software for the backup system 414, and downloaded content 1134. The OS 1132 may be any operating system suitable for supporting the services of the backup downloader 426. The OS 1132 can be, for example, a version or variant of the UNIX operating system or the Windows operating system.

Software modules described herein may include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Although the components depicted in FIG. 11 relate primarily to a system that is used to back up data from a computing device, the components are not limited to that application. As one example, at least some of the components may be used to support a data transfer system that transfers video content produced by a security camera to a remote computer. In that application, the security camera may correspond to the first computing device 102 of FIG. 1, and employ components similar to those depicted for the computing device 402 in FIG. 11. Further, the remote computer would correspond to the second computing device 104, and employ components similar to those depicted for the backup downloader 426 in FIG. 11. A person of ordinary skill in the art would understand that these components may be adapted to operate in the security camera application, without departing from the teachings of this application.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Figures and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
   storing content on a computing device;
   determining that a private network is inaccessible to the computing device;
   determining that a plurality of cloud storage services, including a first cloud storage service and a second cloud storage service, are accessible by the computing device;
   determining, based on an available storage capacity of the cloud storage service, that the content is greater than a size threshold associated with the first cloud storage service;
   dividing the content into a plurality of portions, wherein a size of each portion of the plurality of portions is less than the size threshold;
   storing a first portion of the content from the computing device to the first cloud storage service, wherein a size of the first portion is less than the size threshold;
   storing a remaining portion of the content from the computing device to the second cloud storage service;
   accessing a first manifest file stored on the first cloud storage service, and a second manifest file stored on the second cloud storage service;
   determining from the first manifest file that the content has been downloaded from the first cloud storage service;
   determining from the second manifest file that the content has been downloaded from the second cloud storage service; and
   deleting the content from the computing device.

2. The computer-implemented method of claim 1, further comprising:
   modifying the first manifest file stored on the first cloud storage service to indicate that the first portion of the content has been stored to the first cloud storage service; and
   modifying the second manifest file stored on the second cloud storage service to indicate that the second portion of the content has been stored to the second cloud storage service.

3. The computer-implemented method of claim 1, further comprising:
   sending additional content to the first cloud storage service;
   determining from the first manifest file that the private network has not successfully downloaded the additional content; and
   resending the additional content to the first cloud storage service in response to determining that the private network has not successfully downloaded the additional content.

4. The computer-implemented method of claim 1, further comprising:
   encrypting the first portion of the content before storing the first portion of the content.

5. The computer-implemented method of claim 1, wherein the private network is configured to perform a backup of the content when the private network is accessible to the computing device.

6. The computer-implemented method of claim 1, further comprising:
   determining that the computing device is unable to access a backup system operating in the private network; and
   determining from the first manifest file that the content is stored in the private network by the backup system.

7. The computer-implemented method of claim 6, wherein determining that the computing device is unable to access the private network is based at least in part on an identity of a network access point currently accessible by the computing device.

8. The computer-implemented method of claim 6, wherein the private network is a local area network (LAN), and the first cloud storage service and second cloud storage service are accessible by the computing device via a wide area network (WAN).

9. The computer-implemented method of claim 1, wherein:
   the computing device comprises a security camera, and
   the content comprises one or more video files recorded by the security camera.

10. The computer-implemented method of claim 9, wherein additional video files are periodically uploaded to the first cloud storage service and deleted from the first cloud storage service.

11. A computing device, comprising:
    one or more processors; and
    one or more non-transitory computer-readable media to store instructions that are executable by the one or more processors to perform operations comprising:
       capturing content using a camera associated with the computing device;
       storing the content in the one or more non-transitory computer-readable media;

determining that a private network is inaccessible to the computing device;

determining that a plurality of cloud storage services, including a first cloud storage service and a second could storage service, are accessible to the computing device;

determining, based on an available storage capacity of the cloud storage service, that the content is greater than a size threshold associated with the first cloud storage service;

storing a first portion of the content from the computing device to the first cloud storage service, wherein a size of the first portion is less than the size threshold;

storing a remaining portion of the content from the computing device to the second cloud storage service;

determining that the first portion has been downloaded from the first cloud storage service to the private network;

determining that the remaining portion has been downloaded from the second cloud storage service to the private network; and deleting the content from the one or more non-transitory computer-readable media.

12. The computing device of claim 11, further comprising:

modifying a first manifest file stored on the first cloud storage service to indicate that the first portion of the content has been stored to the first cloud storage service; and modifying a second manifest file stored on the second cloud storage service to indicate that the remaining portion of the content has been stored to the second cloud storage service.

13. The computing device of claim 11, further comprising:

determining that additional content has been stored in the one or more non-transitory computer-readable media;

storing the additional content to the first cloud storage service;

determining from the first manifest file that the private network was unsuccessful in downloading the additional content from the first cloud storage service; and storing the additional content to the first cloud storage service.

14. The computing device of claim 11, further comprising:

encrypting the first portion of the content before storing the first portion of the content.

15. The computing device of claim 11, wherein the private network is configured to perform a backup of the content when the private network is accessible to the computing device.

16. One or more non-transitory computer-readable media to store instructions that are executable by one or more processors to perform operations comprising:

storing content in the one or more non-transitory computer-readable media of a computing device;

determining that a private network is inaccessible to the computing device;

determining that a plurality of cloud storage services, including a first cloud storage service and a second could storage service, are accessible to the computing device;

determining, based on an available storage capacity of the cloud storage service, that the content is greater than a size threshold associated with the first cloud storage service;

storing a first portion of the content from the computing device to the first cloud storage service, wherein a size of the first portion is less than the size threshold;

storing a remaining portion of the content from the computing device to the second cloud storage service;

determining that the first portion has been downloaded from the first cloud storage service to the private network;

determining that the remaining portion has been downloaded from the second cloud storage service to the private network; and deleting the content from the one or more non-transitory computer-readable media.

17. The one or more non-transitory computer-readable media of claim 16, further comprising:

modifying a first manifest file stored on the first cloud storage service to indicate that the first portion of the content has been stored to the first cloud storage service; and modifying a second manifest file stored on the second cloud storage service to indicate that the remaining portion of the content has been stored to the second cloud storage service.

18. The one or more non-transitory computer-readable media of claim 16, further comprising:

determining that additional content has been stored in the one or more non-transitory computer-readable media;

storing the additional content to the first cloud storage service;

determining from the first manifest file that the private network was unsuccessful in downloading the additional content from the first cloud storage service; and storing the additional content to the first cloud storage service.

19. The one or more non-transitory computer-readable media of claim 16, further comprising:

encrypting the first portion of the content before storing the first portion of the content.

20. The one or more non-transitory computer-readable media of claim 16, wherein the private network is configured to perform a backup of the content when the private network is accessible to the computing device.

* * * * *